United States Patent
Bokodi et al.

(10) Patent No.: US 8,317,508 B2
(45) Date of Patent: Nov. 27, 2012

(54) FRAME FOR A DEVICE FOR MANUFACTURING A THREE-DIMENSIONAL OBJECT AND DEVICE FOR MANUFACTURING A THREE-DIMENSIONAL OBJECT BY SUCH A FRAME

(75) Inventors: Attila Bokodi, München (DE); Martin Leuterer, Olching (DE)

(73) Assignee: EOS GmbH Electro Optical Systems, Krailling (DE)

( * ) Notice: Subject to any disclaimer, the term of this patent is extended or adjusted under 35 U.S.C. 154(b) by 346 days.

(21) Appl. No.: 12/587,820

(22) Filed: Oct. 13, 2009

(65) Prior Publication Data

US 2010/0101490 A1 Apr. 29, 2010

Related U.S. Application Data

(60) Provisional application No. 61/197,052, filed on Oct. 22, 2008.

(30) Foreign Application Priority Data

Oct. 13, 2008 (DE) .......................... 10 2008 051 478

(51) Int. Cl.
*B28B 17/00* (2006.01)
*B28B 1/30* (2006.01)
*B29C 67/00* (2006.01)

(52) U.S. Cl. ........................................ 425/375; 264/497
(58) Field of Classification Search .................. 425/375, 425/174.4, 143; 264/308, 401, 497
See application file for complete search history.

(56) References Cited

U.S. PATENT DOCUMENTS

| | | | | |
|---|---|---|---|---|
| 3,797,986 | A | * | 3/1974 | Onder ........................... 425/352 |
| 4,208,043 | A | * | 6/1980 | Sieurin ......................... 266/275 |
| 4,227,037 | A | * | 10/1980 | Layton .......................... 174/386 |
| 5,525,050 | A | * | 6/1996 | Takizawa et al. ............. 425/143 |
| 5,637,175 | A | * | 6/1997 | Feygin et al. ................. 156/264 |
| 6,554,600 | B1 | | 4/2003 | Hofmann et al. |
| 6,722,872 | B1 | * | 4/2004 | Swanson et al. .............. 425/225 |
| 6,824,714 | B1 | | 11/2004 | Türck et al. |
| 2004/0026418 | A1 | * | 2/2004 | Ederer et al. ............... 220/23.86 |
| 2008/0190905 | A1 | | 8/2008 | Heinlein |

FOREIGN PATENT DOCUMENTS

| | | |
|---|---|---|
| DE | 199 39 616 | 3/2001 |
| GB | 2 179 440 | 3/1987 |
| SU | 1407680 | 7/1988 |
| WO | WO-00/21736 | 4/2000 |

OTHER PUBLICATIONS

"MACOR Machinable Glass Ceramic", 2002, Accuratus, accessible at http://accuratus.com/macorfab.html.*
Russian Office Action mailed Apr. 20, 2012 (English).

* cited by examiner

*Primary Examiner* — Yogendra Gupta
*Assistant Examiner* — Alison Hindenlang
(74) *Attorney, Agent, or Firm* — Edwards Wildman Palmer LLP; George W. Neuner

(57) ABSTRACT

The present invention relates to a frame (1) of a device for manufacturing a three-dimensional object (3). The device manufactures the three-dimensional object (3) by solidifying a powder or liquid building material (3a) layer by layer at locations in each layer corresponding to the cross-section of the object (3) to be manufactured in a building space. The building space is defined by the frame (1) and a platform (2) inside the frame (1), wherein the frame (1) comprises at the inner side facing the building space glass ceramic plates.

19 Claims, 4 Drawing Sheets

FRAME FOR A DEVICE FOR MANUFACTURING A THREE-DIMENSIONAL OBJECT AND DEVICE FOR MANUFACTURING A THREE-DIMENSIONAL OBJECT BY SUCH A FRAME

The present invention relates to a frame of a device for manufacturing a three-dimensional object according to the preamble of claim 1.

A generic frame of a device for manufacturing a three-dimensional object is disclosed in WO00/21736 A. The device manufactures the three-dimensional object by solidifying a powder or liquid building material layer by layer at locations in each layer corresponding to the cross-section of the object to be manufactured in each layer by action of a laser or another energy source. The frame and the platform define a building space, in which the three-dimensional object is manufactured. The frame and the platform are modularly connected as a replaceable frame, wherein the replaceable frame can be inserted into the device and removed therefrom.

A similar device for manufacturing a three-dimensional object is known from DE 199 39 616 A1. In the device according to this prior art, the building space is conventionally heated on a temperature of 100 to 150° C. during a laser sinter process.

There is a problem in these conventional devices for manufacturing a three-dimensional object that external heating of the frame on much higher temperatures is not possible yet, since the surroundings of the frame would be thermally burdened.

It is the object of the present invention to provide a frame of a device for manufacturing a three-dimensional object, which enables heating of the building space on much higher temperatures.

This object is achieved by a frame of a device for manufacturing a three-dimensional object having the features of claim 1 and by a device having the features of claim 10. Advantageous further developments are indicated in the dependent claims.

By use of glass ceramic plates and by selectively controlling the required heating zones, process temperatures up to 370° C. are possible. When the platform is arranged on the top at the beginning of the building process, only the upper area of the frame is heated. According to the building progress, the lower heating zones are switched on. Thereby, any excessive thermal burden is avoided in particular in the lift mechanism located below. Further, the glass ceramic plates do not excessively conduct the heat in the vertical direction. This is particularly advantageous at the beginning of the building process, since the lift mechanism is not thermally burdened.

The device for manufacturing a three-dimensional object is particularly suitable as high temperature laser sintering machine, in which sintering powder having a high melting point such as polyetheretherketone (PEEK) is processed.

Further features and advantages of the invention are obvious from the description of an embodiment on the basis of the enclosed drawings. To the drawings:

FIG. 1 is a schematic view of a device for manufacturing a three-dimensional object 3 according to the present invention, which is embodied as a laser sintering device in the embodiment.

Figure 1:
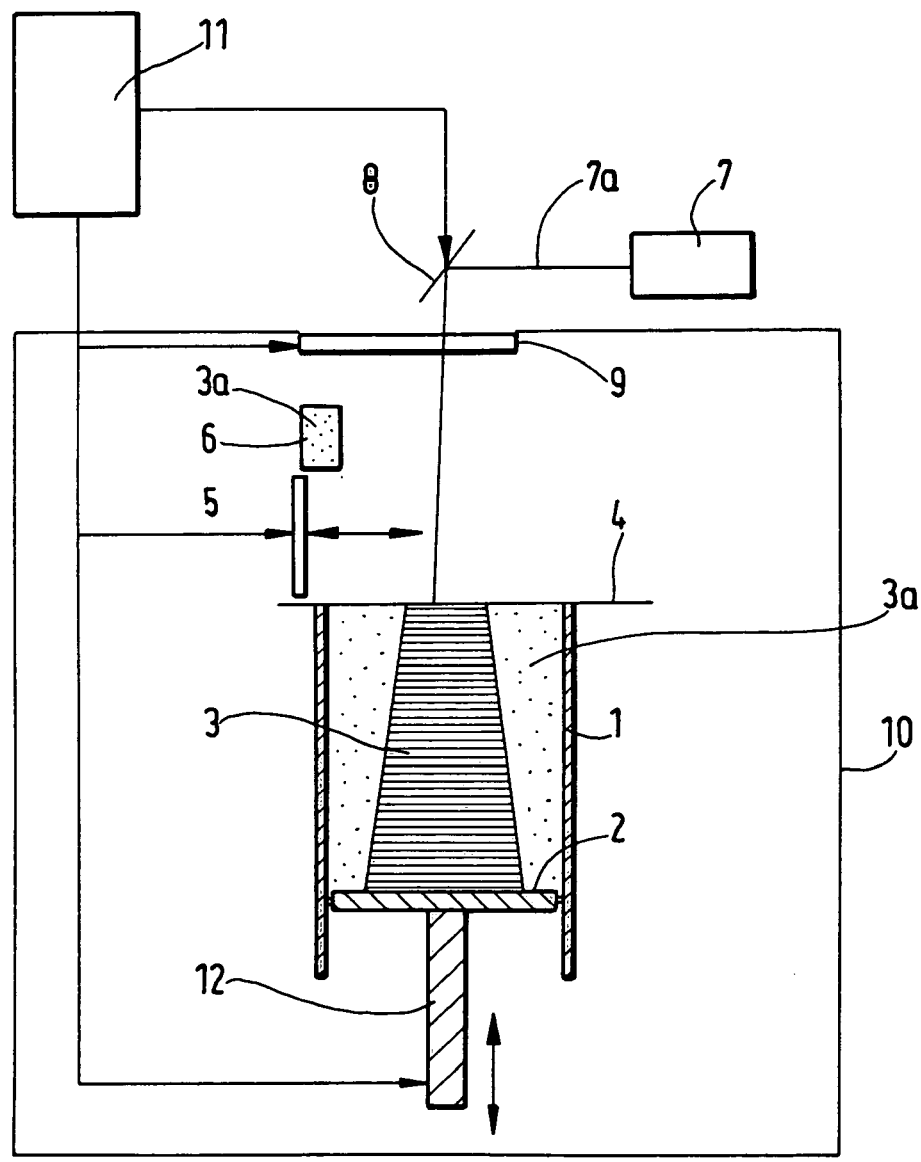
FIG. 1 is a schematic view of a device for manufacturing a three-dimensional object according to the present invention.

The laser sintering device comprises a frame 1 which opens in the upper side and has therein a platform 2, which is movable in the vertical direction and supports the three-dimensional object 3 to be manufactured. The frame 1 and the platform 2 define inside a building space. The platform 2 is connected to a lift mechanism 12 moving the platform 2 in a vertical direction such that the layer of the object 3 to be solidified lies in a working plane 4. The frame 1 and the platform 2 are modularly connected to each other as a replaceable frame. After completion of manufacturing of the three-dimensional object 3, the replaceable frame having therein the build-up object 3 can be removed from the device and replaced by a new replaceable frame.

Further, a dispenser 5 for applying a layer of powder building material 3a is provided. As building material 3a, any powder is applicable which can be processed by laser, such as polyamide, polystyrene, metals, ceramics, compound materials and in particular high-temperature plastics, such as PEEK. First, the frame 1 is supplied with the building material 3a from a storage container 6. Thereafter, the dispenser 5 is moved to a predetermined height in the working plane 4 so that the layer of the powder building material 3a lies in a predetermined height above the last solidified layer. The device further comprises a laser 7 generating a laser beam 7a which is focused to a predetermined point in the working plane 4 by a deflection means 8. Thereby, the laser beam 7a can selectively solidify the powder building material 3a at the locations in the respective layer corresponding to the cross-section of the object 3 to be manufactured.

Reference sign 10 designates a process chamber, in which the frame 1, the platform 2, the lift mechanism 12 and the dispenser 5 can be arranged. Reference sign 9 designates an opening in the process chamber 10 for introducing the laser beam 7a. Further, a control unit 11 is provided, by which the device is co-ordinately controlled to perform the building process.

During operation of the device, the platform 2 is moved by the lift mechanism 12 in a first step, until the upper side thereof lies below the working plane 4 by an amount of the thickness of one layer. Then, a first layer of the material 3a is applied and flattened by the storage container 6 and the dispenser 5, respectively. Thereafter, the control unit 11 controls the deflection means 8 such that the deflected layer beam 7a selectively impinges on the locations to be solidified in the layer of the material 3a. Thereby, the material 3a is solidified and sintered, respectively, at these locations.

In the next step, the platform 2 is lowered by the lift mechanism 12 by an amount of the thickness of the next layer. A second material layer is applied and flattened by the storage container and the dispenser 5, respectively, and it is selectively solidified by the laser beam 7a. These steps are repeated until the desired object 3 is manufactured.

Figure 2:
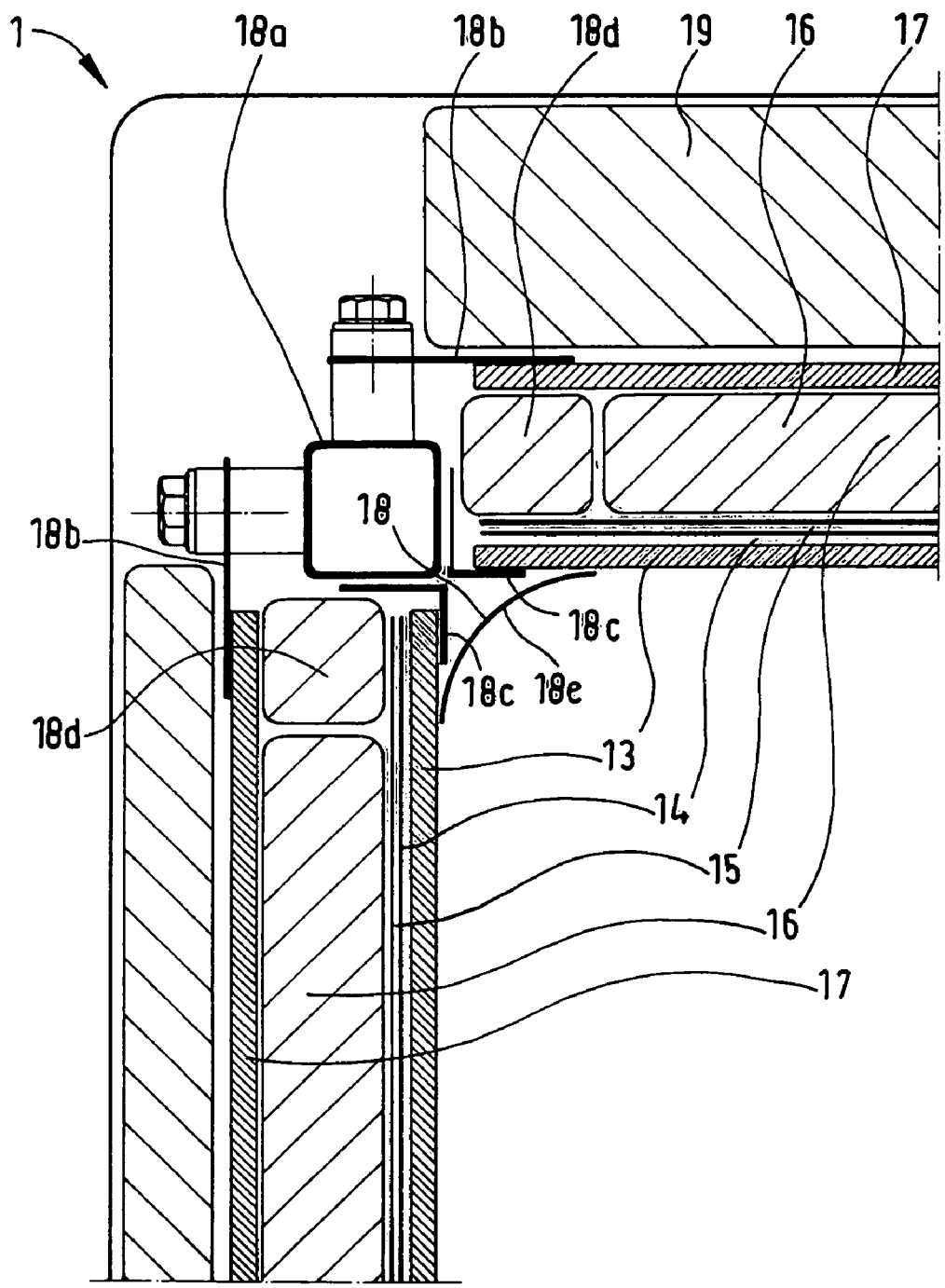
FIG. 2 is a schematic horizontal section view of a portion of the frame of the device for manufacturing a three-dimensional object according to the present invention.

FIG. 2 is a schematic horizontal section view of a portion of the frame 1 of the device for manufacturing a three-dimensional object 3 according to the present invention.

At the inner side facing the building space, the frame 1 comprises glass ceramic plates 13. For instance, glass ceramic plates 13 of the manufacturer Schott AG named Robax (registered trademark) can be used. In the described embodiment, the glass ceramic plates 13 have a wall thickness of about 5 mm. Particular properties of the glass ceramic plates 13 are high temperature resistance and a relatively small thermal expansion coefficient so that there is nearly no distortion at high temperature differences along the plate. Thereby, the glass ceramic plates 13 exhibit no defects such as cracking (like normal glass) or bulging (like metals). The glass ceramic plates 13 further have relatively low heat conductivity so that there is substantially no heat transfer, in particular in the direction of the plane of the plate. The temperature gradient in the plane of the plate is substantially maintained. Further, the glass ceramic plates 13 have good evenness so that good sealing between the frame 1 and the platform 2 and/or a sealing lip attached thereon is achieved, in particular by an integral glass ceramic plate 13. Moreover, cleaning of the glass ceramic plates 13 is easy, and no expansion gaps are created, which would be filled by powder.

At an outer side of the glass ceramic plates 13 averted from the building space, the frame 1 further has surface heating elements 14. For instance, surface heating elements 14 of the manufacturer Freek named Mikanit (trademark) can be used. In the embodiment, the surface heating elements 14 consist of synthetic mica plates wrapped by flat heating wires as resistive heater. The synthetic mica plates are usually connected on both sides to insulator plates and carrier plates. However, direct mounting the synthetic mica plates onto the electrical insulated glass ceramic plates 13 enables omitting the inner insulator- and carrier plates. Thereby, good thermal connection of the heating wires to the glass ceramic plates 13 is enabled.

Figure 3:
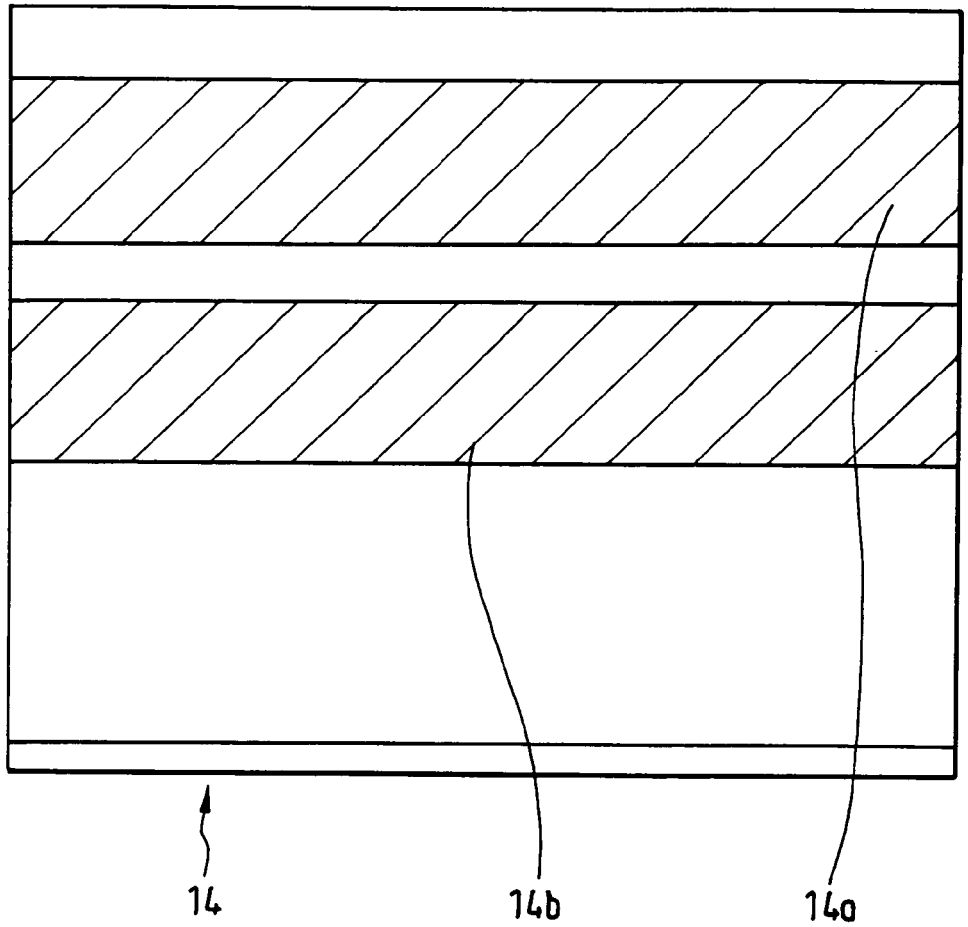
FIG. 3 is a schematic vertical section view of a surface heating element having two heating zones for the frame according to the present invention.

FIG. 3 is a schematic vertical section view of a surface heating element 14 having two heating zones 14a, 14b of the frame 1 according to the present invention. In the embodiment, the surface heating elements 14 define the two vertically superposed heating zones 14a, 14b which are individually controlled. In accordance with the building progress, the control device 11 controls only the heating zone/zones above the platform 2. Such surface heating elements 14 allow simple handling, since only one compact surface heating element 14 is to be mounted on each side of the frame 1. Further, these surface heating elements 14 allow simple configuration with respect to the number and position of the heating zones 14a, 14b which are individually controllable. Thereby, the heated area is increased downwards according to the building progress, so that only those areas will be heated as temporarily required and actually filled by the powder. Thereby, the heat is released to the outside as less as possible, and on the other hand, distortion of the three-dimensional body is avoided.

Figure 4:
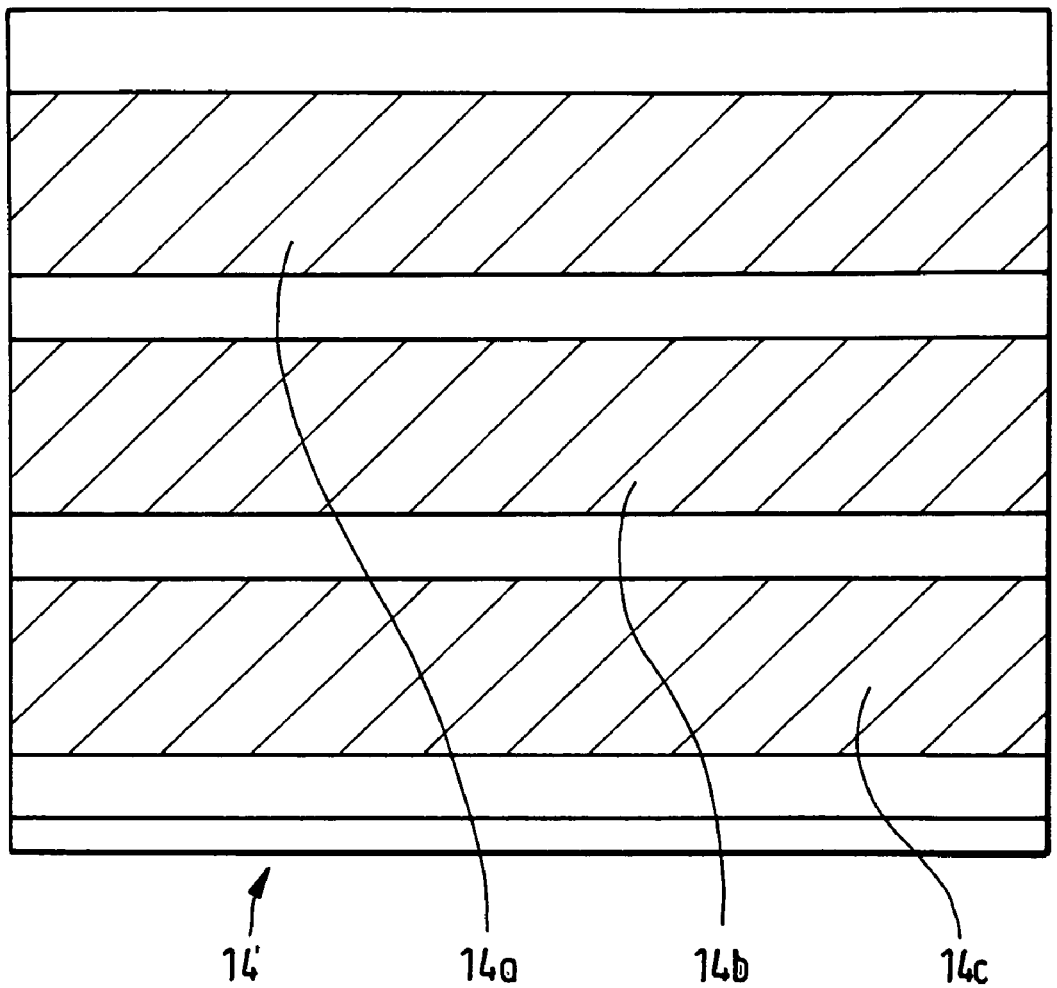
FIG. 4 is a schematic vertical section view of a surface heating element having three heating zones for the frame according to the present invention.

FIG. 4 is a schematic vertical section view of a surface heating element 14' of another embodiment. The surface heating element 14' is similar to the surface heating element 14 with the exception that the surface heating element 14' has three heating zones 14a, 14b, 14c. The control device 11 controls only the heating zone/zones above the platform 2 according to the building progress, that is in the chronological order of 14a, 14b, 14c.

Temperature detectors (not shown) are integrated in the surface heating elements 14; 14'. They are in a surface contact with the corresponding glass ceramic plate 13 approximately in the middle of the corresponding heating zone 14a, 14b; 14c. This enables real-time temperature measurement in which the temperature of the power bed can be set close to the process temperature.

At an outer side averted from the building space, the surface heating elements 14; 14' further have graphite layer plates 15. These graphite layer plates 15 are not necessarily required, but they offer the advantage of even heat distribution. They have a size of one heating hone 14a, 14b; 14c of the corresponding surface heating element 14; 14'. For instance, graphite layer plates 15 of the manufacturer SGL Carbon AG named Sigraflex (registered trademark) can be used. The graphite layer plates 15 have the property of high anisotropic heat conductivity, that means the heat conductivity in the direction of the plane of the graphite layer plates 15 is much higher than in the direction of the plane vertical thereto.

At the outer side of the surface heating elements 15 averted from the building space, the frame 1 further has fibre glass mats 16. For instance, fibre glass mats 16 of the manufacturer Promat GmbH named Promaglaf HTI 1200 (registered trademark) can be used. The fibre glass mats 16 shall provide for surface pressure of the glass ceramic plates 13 as well as of other plate components of the frame 1 towards support elements 18, which are described later. At the same time, the fibre glass mats 16 provide for good heat insulation to the outside and to the lower side. A further advantage of the fibre glass mats 16 is their elasticity at temperature cycles.

At the outer side of the fibre glass mats 16 averted from the building space, the frame 1 further has outer plates 17, in particular of glass ceramic. The outer plates 17 press the fibre glass mats 16 together with the support elements 18 to the inside, which is described later.

The frame 1 further has the supporting elements 18, in particular of stainless steel, which support the frame 1, in particular at the edges thereof. In particular, the support elements 18 press the glass ceramic plates 13 and the outer plates 17 to each other. Thereby, the fibre glass mats 16, which are interposed therebetween, are compressed and biased. Further, the support elements 18 are arranged on the respective edges of the frame 1 and connect the individual walls of the frame 14. In the embodiment, the support elements 18 are made of stainless steel so that they have lower heat conductivity and a lower thermal expansion coefficient compared with aluminium, for instance. Moreover, stainless steel has better resistance to corrosion as compared with aluminium.

The support elements 18 include corner bars 18a having a hollow square profile being as thin as possible. By the thin wall thickness, heat conductivity is restricted. The support elements 18 further include holding plates 18c for supporting the glass ceramic plates 13 from the inner side. The support elements 18 further include outer pressing plates 18b being screwed on the hollow profile 18a to press the layer components of the frame 1 to each other in cooperation with the holding plates 18c. The four walls of the frame 1 are joined together by this structure. The support elements 18 further include spacers 18d, in particular of a thermal insulating material, which preset the distance between the glass ceramic plates 13 and the outer plates 17. The support elements 18 further include border plates 18e to provide a radius at inner edges of the frame 1. The border plates 18e prevent the powder from entering into the gaps between the respective components of the frame 1, and they facilitate cleaning of the frame 1. The support elements 18 provide for complete support of the frame 1 so that the glass ceramic plates 13, which are relatively refractory, may not necessarily have any function of supporting the frame 1.

At the outer side of the outer plates 17 averted from the building space, the frame 1 further has a casing 19. The casing 19 forms the housing of the frame 1 and provides for further thermal insulation to the outside.

The thus structured frame 1 has the following properties:
The frame 1 and the associated device are suitable to manufacture a three-dimensional object 3 of a building material 3a having a melting point being higher than 150° C., and particularly being higher than 180° C. By the used materials and by selectively controlling the required heating zones 14a, 14b; 14c, process temperatures of more than approximately 370° C. are possible. When the platform 2 is arranged on the top at the beginning of the building process, only the upper area of the frame 1 is heated which is actually filled by the powder. According to the building progress, the heating zones located below are switched on. Thereby, excessive thermal load, in particular of the lift mechanism 12, is avoided. Moreover, the material of the glass ceramic plates 13 hardly conducts heat in a vertical direction. This is an advantage in particular at the beginning of the building process, since thermal burden of the lift mechanism 12 is not excessive. As a result, almost no heat is released to the lower side and to the outside.

In the embodiment, the frame is described as a layer combination of several components, wherein adjacent components are in contact with each other. However, this contact is not relevant for the invention so that further layers may be arranged between the described layer components without departing the scope as defined in the claims. In particular, the term "outer side averted from the building space" as used in the claims does not necessarily mean the physical outer surface of the corresponding layer component. The term "outer side averted from the building space" rather indicates the orientation of the layer arrangement starting out from the building space towards the outside.

The scope is not restricted to the described embodiment, but further amendments and modifications are included provided that they fall within the scope as defined by the enclosed claims.

For instance, the frame and the device for manufacturing a three-dimensional object according to the invention are not restricted to laser sintering devices. The frame is also suitable for use in a stereolithography device using as building material a heat curing resin instead of a powder, or for an electron beam sintering device or electron beam melting device using an electron beam instead of the laser. Moreover, the use in three-dimensional printing or in FDM (fused deposition molding) is conceivable.

The invention claimed is:

1. A replaceable frame of a device for manufacturing a three-dimensional object, said replaceable frame comprising a frame and a platform, which is vertically movable in the frame,
    wherein said frame and said platform define a building space,
    wherein said replaceable frame can be inserted into the device and removed therefrom,
    wherein the device manufactures the three-dimensional object in said building space by solidifying a powder or liquid building material layer by layer at locations in each layer that correspond to the cross-section of the object to be manufactured in the respective layer,
    said frame further comprising an inner side and one or more glass ceramic plates at the inner side facing the building space.

2. The replaceable frame according to claim 1, further comprising a frame outer side and surface heating elements at the outer side of the glass ceramic plates averted from the building space.

3. The replaceable frame according to claim 2, wherein the surface heating elements define a plurality of heating zones which are vertically arranged above each other and are individually controllable.

4. The replaceable frame according to claim 2, wherein the surface heating elements each comprise a heating element outer side and the frame further comprises graphite layer plates at the heating element outer side of the surface heating elements averted from the building space.

5. The replaceable frame according to claim 2, wherein the surface heating elements each comprise a heating element outer side and the frame further comprises fiber glass mats arranged at the heating element outer side of the surface heating elements averted from the building space.

6. The replaceable frame according to claim 4, the frame further comprising fiber glass mats arranged at the heating element outer side of the surface heating elements averted from the building space.

7. The replaceable frame according to claim 5, further comprising outer glass ceramic plates at the outer side of the fiber glass mats averted from the building space.

8. The replaceable frame according to claim 6, further comprising outer glass ceramic plates at the outer side of the fiber glass mats averted from the building space.

9. The replaceable frame according to claim 2, further comprising support elements that supporting the components of the frame.

10. The replaceable frame according to claim 2, further comprising edges and stainless steel support elements that supporting the components of the frame at the edges thereof.

11. A device for manufacturing a three-dimensional object, the device comprising a replaceable frame,
    said replaceable frame comprising a frame and a platform, which is vertically movable in the frame,
    wherein said frame and said platform define a building space,
    wherein said replaceable frame can be inserted into the device and removed therefrom,
    wherein the device manufactures the three-dimensional object in said building space by solidifying a powder or liquid building material layer by layer at locations in each layer that correspond corresponding to the cross-section of the object to be manufactured in the respective layer,
    said frame further comprising an inner side and one or more glass ceramic plates at the inner side facing the building space.

12. The device according to claim 11, the device further comprising a laser or another energy source to solidify the shape of the powder at locations in each layer corresponding to the cross-section of the object to be manufactured.

13. The device according to claim 11, wherein the powder has a melting point of more than 180° C.

14. The device according to claim 12, wherein the powder has a melting point of more than 180° C.

15. The device according to claim 11, said replaceable frame further comprising a frame outer side and surface heating elements at the outer side of the glass ceramic plates averted from the building space wherein the surface heating elements define a plurality of heating zones which are vertically arranged above each other and are individually controllable, and the device further comprising a control device for controlling only the heating zone/zones which are above the platform according to the building progress of the object.

16. The device according to claim 12, said replaceable frame further comprising a frame outer side and surface heating elements at the outer side of the glass ceramic plates averted from the building space wherein the surface heating elements define a plurality of heating zones which are vertically arranged above each other and are individually controllable, and the device further comprising a control device for controlling only the heating zone/zones which are above the platform according to the building progress of the object.

17. The device according to claim 13, said replaceable frame further comprising a frame outer side and surface heating elements at the outer side of the glass ceramic plates averted from the building space wherein the surface heating elements define a plurality of heating zones which are vertically arranged above each other and are individually controllable, and the device further comprising a control device for controlling only the heating zone/zones which are above the platform according to the building progress of the object.

18. The device according to claim 14, said replaceable frame further comprising a frame outer side and surface heating elements at the outer side of the glass ceramic plates averted from the building space wherein the surface heating elements define a plurality of heating zones which are vertically arranged above each other and are individually controllable, and the device further comprising a control device for controlling only the heating zone/zones which are above the platform according to the building progress of the object.

19. The device according to claim 11, wherein the frame and the platform are modularly connected with each to provide a replaceable frame, wherein the replaceable frame can be inserted in the device and removed therefrom.

* * * * *